No. 714,113. Patented Nov. 18, 1902.
G. N. SCEETS.
JOURNAL BEARING.
(Application filed May 15, 1901.)
(No Model.)

Witnesses.
Geo. W. Young.
Chas. L. Goss.

Inventor:
George N. Sceets,

UNITED STATES PATENT OFFICE.

GEORGE N. SCEETS, OF CHICAGO, ILLINOIS, ASSIGNOR OF FIFTY-ONE ONE-HUNDREDTHS TO AUGUST J. WEIL, OF NEW YORK, N. Y.

JOURNAL-BEARING.

SPECIFICATION forming part of Letters Patent No. 714,113, dated November 18, 1902.

Application filed May 15, 1901. Serial No. 60,268. (No model.)

*To all whom it may concern:*

Be it known that I, GEORGE N. SCEETS, a citizen of the United States, residing at Chicago, in the county of Cook and State of Illinois, have invented certain new and useful Improvements in Journal-Bearings, of which the following is a specification, reference being had to the accompanying drawings, forming a part thereof.

My invention relates particularly to that class of journal-bearings which rest on the upper sides of their journals and are supplied with oil from wells or receptacles below the journals, the oil being delivered to the exposed parts of the journals and carried by them to the surfaces of the bearings in contact therewith.

The main objects of the invention are to provide for effective distribution of the oil to the bearing-surfaces, to insure thorough lubrication, and prevent heating.

It consists in a novel construction and arrangement of oil supply or feeding and distributing channels in the working faces of such bearings, as hereinafter particularly described, and pointed out in the claims.

In the accompanying drawings, which illustrate my invention as embodied in a car journal-bearing, like letters designate the same parts in both figures.

Figure 1:
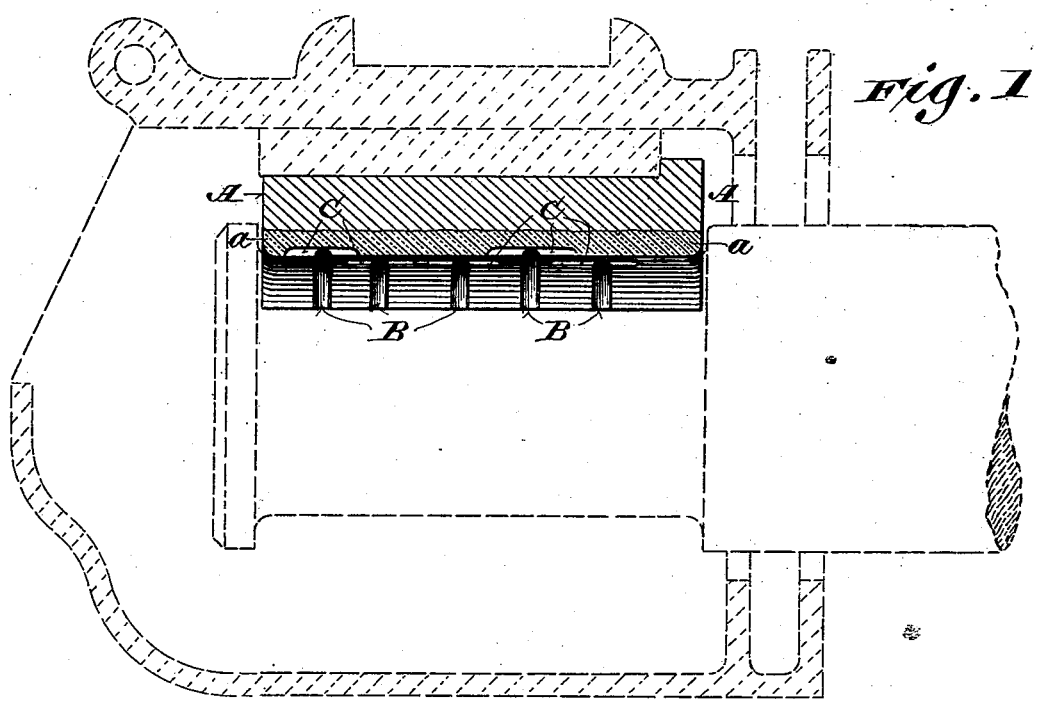
Figure 2:
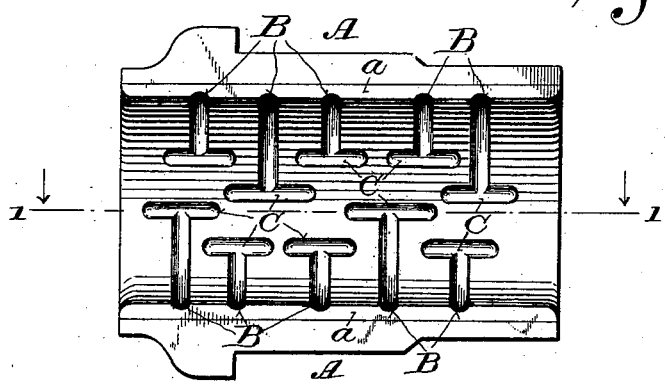

Figure 1 is a longitudinal section of the bearing on the line 1 1, Fig. 2, an associated journal and journal-box being indicated in connection therewith by dotted lines; and Fig. 2 is an inverted plan or face view of the bearing.

For the purpose of illustration I have shown and will describe my invention as applied to and embodied in a car journal-bearing which rests upon the upper side of the journal and in which the journal is intended to turn in either direction, but the invention is applicable with little or no change to bearings for other purposes. In this class of bearings, in which their journals bear on one side only and oil is supplied to the exposed sides of the journals and carried thereon to the bearing-surfaces, the close fit between the journals and their bearings and the weight to which they are subjected tend to force and exclude the oil from the contact-faces of the bearings and journals, and thus cause them to run dry and become heated. It is the purpose of my improved construction and arrangement of oil feeding and distributing channels herein shown and described to avoid these difficulties and objections, which are a source of great trouble and annoyance in bearings of this kind.

Referring to the drawings, A designates an ordinary car journal-bearing. It is shown as provided with a composition lining $a$, but may be made of any suitable metal without such lining. In its working face it is provided with circumferential oil-feeding channels B B, which in the present instance are shown as extending from opposite edges of the bearing to or toward its longitudinal center, and C C are blind oil-distributing channels intersecting the feeding-channels B B at their inner ends and extending lengthwise of the bearing toward its ends, terminating in circumferential lines which intersect one or more of the other distributing-channels, so that any point in the journal, except at its extreme ends, turning in the bearing will intersect one or more of the distributing-channels C. The distributing-channels C preferably cross or extend in opposite directions from the feeding-channels B or are arranged in T form, as shown in Fig. 2; but they may be arranged in L form or extend on one side only from the intersecting feeding-channels. The feeding-channels are preferably made of different lengths, so that the blind distributing-channels at their inner ends will be offset or staggered with relation to each other, and this may be done as shown in Fig. 2 or in any other suitable manner which will effect thorough distribution of the oil over the entire contact-surface between the bearing and journal.

For bearings in which the journals are to turn in one direction only all of the feeding-channels may run from one edge of the bearings toward the other, terminating in cross distributing-channels at different points in the bearing, so as to most effectively distribute the oil to the bearing-surfaces.

In operation the oil which is supplied to the exposed part of the journal from the well or receptacle below it by the cotton-waste with which the journal-box is provided or by other suitable means is carried on the journal through the feeding-channels B, opening through one edge thereof into the cross-channels C, by which it is distributed lengthwise of the journal and supplied to the comparatively small area of opposing surfaces on the bearing and journal between adjacent distributing-channels. In passing the oil-channels the journal is momentarily relieved of pressure and exposed to the cooling effect of the oil contained in said channels and to more or less air entrained with the oil. In this way the journal is kept cool, the contact-surfaces of the bearing and journal, which are separated into comparatively small divisions by the oil-channels, are thoroughly lubricated, and friction is reduced to a minimum. The oil-channels may be cut, cast, or otherwise formed in the substance of the bearing or of its lining, and if the bearing is provided with a lining they may be made of sufficient depth to extend completely through it into the body of the bearing.

Various changes in the minor details of construction and arrangement of the oil-channels may be made in applying them to bearings of different kinds and for different purposes within the principle and intended scope of the invention.

I claim—

1. A journal-bearing having independent T-shaped oil-channels in its working face.

2. A journal-bearing having a number of blind oil-distributing channels extending lengthwise of the bearing and scattered throughout its working face, and circumferential feeding-channels leading to said distributing-channels.

3. A journal-bearing having in its working face circumferential oil-feeding channels, and blind oil-distributing channels intersecting the feeding-channels at their inner ends.

4. A journal-bearing having in its working face circumferential oil-feeding channels, and blind oil-distributing channels extending toward each end of the bearing from the inner ends of the feeding-channels.

5. A journal-bearing having in its working face circumferential oil-feeding channels terminating at different points therein in blind oil-distributing channels each of which extends lengthwise of the bearing to or beyond the ends of adjacent oil-distributing channels.

6. A journal-bearing having in its working face circumferential oil-feeding channels extending from opposite edges of the bearing toward its longitudinal center and terminating at different points therein in blind cross-channels running lengthwise of the bearing and each extending to or beyond a circumferential line intersecting one or more other cross-channels.

7. A journal-bearing having in its working face circumferential oil-feeding channels terminating at different points therein in blind oil-distributing channels each of which extends in both directions from its distributing-channel toward the ends of the bearing and terminates in circumferential lines intersecting one or more other oil-distributing channels.

8. A journal-bearing having in its working face circumferential oil-feeding channels extending from opposite edges of the bearing toward its longitudinal center and terminating at different points therein in blind oil-distributing channels each of which extends in both directions from its feeding-channel toward the ends of the bearing and terminates in circumferential lines intersecting one or more other oil-distributing channels.

9. A journal-bearing having in its working face circumferential oil-feeding channels of different lengths and blind longitudinal oil-distributing channels intersecting the feeding-channels and offset or staggered with relation to each other.

In witness whereof I hereto affix my signature in presence of two witnesses.

GEORGE N. SCEETS.

Witnesses:
CHAS. L. GOSS,
ALICE E. GOSS.